United States Patent

[11] 3,610,997

[72] Inventors Dick Lundquist;
Marius Widakowich, both of Bromma, Sweden

[21] Appl. No. 26,377
[22] Filed Apr. 7, 1970
[45] Patented Oct. 5, 1971
[73] Assignee Allmanna Svenska Elektriska Aktiebolaget Vasteras, Sweden
[32] Priority Apr. 8, 1969
[33] Sweden
[31] 4874/69

[54] SEMICONDUCTOR ELEMENT
9 Claims, 3 Drawing Figs.

[52] U.S. Cl. .................... 313/325, 29/191, 29/194, 62/3, 136/86, 338/331, 338/332
[51] Int. Cl. .................... H01m 27/00
[50] Field of Search .................... 313/325; 338/331, 332; 29/191, 194; 136/86 F; 62/3

[56] References Cited

UNITED STATES PATENTS

| | | | |
|---|---|---|---|
| 2,696,513 | 12/1954 | Lehovec | 136/83 |
| 3,138,490 | 6/1964 | Tragert et al. | 136/86 |
| 3,432,352 | 3/1969 | White et al. | 136/86 |
| 3,436,269 | 4/1969 | Mitoff | 136/86 |
| 3,447,233 | 6/1969 | Weinstein et al. | 29/472.9 |

*Primary Examiner*—David Schonberg
*Assistant Examiner*—Paul A. Sacher
*Attorney*—Jennings Bailey, Jr.

ABSTRACT: A semiconductor element for a thermoelectric heat pump, with a body of semiconducting material which is shaped as a shell with essentially constant wall thickness, a first cup-shaped metal electrode in contact with the outer surface of the body, a second metal electrode in contact with the inner surface of the body, both electrodes having smaller cross sections at the open end of the cavity defined by said first electrode, whereby forces tending to pull the electrodes apart are prevented from exerting any tensile or shear stresses on the semiconductor material.

INVENTORS
DICK LUNDQVIST
MARIUS WIDAKOWICH
BY
Jennings Bailey, Jr

SEMICONDUCTOR ELEMENT

BACKGROUND OF THE INVENTION

1. Field of the Invention

The present invention relates to a semiconductor element comprising a first and a second metal electrode and a body of a semiconducting material.

2. The Prior Art

Such semiconductor elements are used, for example in thermoelectric devices, each element being in electric and thermic contact on both sides with a cooling body, and a great number of elements and cooling bodies being built together into a unit for cooling or heating a gaseous medium or for directly converting thermal energy to electric energy. The semiconductor material in these elements may be, for example, bismuth telluride and is usually fragile. It has usually poor resistance, particularly to tension and shear stresses. Such stresses often arise in the large units and there are therefore considerable risks of damage to the elements. This problem is accentuated because the equipment often operates in places where accelerations and vibrations occur, such as equipment fitted in vehicles.

SUMMARY OF THE INVENTION

The invention relates to an element having extremely good resistance to mechanical stresses. It is characterized in that the semiconductor body is shaped as a cylindrical shell having substantially constant shell thickness, that one section of the first electrode is shaped as a cup surrounding the outer sheath surface of the body, the cross-sectional area of the cup at its opening being less than the rest of it, and that one section of the other electrode is shaped as a piston applied in contact with the inner sheath surface of the semiconductor body.

The invention relates also to a method of manufacturing a semiconductor element according to the invention.

BRIEF DESCRIPTION OF THE DRAWINGS

The invention will be described in more detail with reference to the accompanying FIGS. 1–3, which show in cross section semiconductor elements embodying the invention.

DESCRIPTION OF THE PREFERRED EMBODIMENTS

Figure 1:
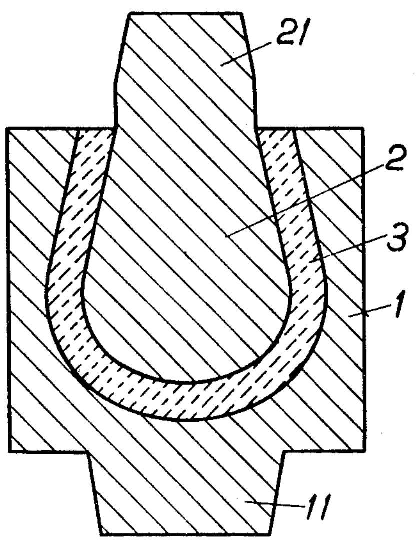

FIG. 1 shows a semiconductor element according to the invention. The electrode 1 is shaped as a circular cylindrical cup. Inside this, and shaped so that the distance between the two electrodes is substantially constant everywhere, is the electrode 2. The electrodes may be of copper or some other material having good electric and thermic conducting capacity, and the parts 11 and 21 projecting from the element are intended for connection to cooling bodies or other heat-transmitting members, not shown. As shown in the drawings these parts may be conical and designed to be inserted into corresponding apertures in the cooling bodies, or they may be provided with threads for screwing into the cooling bodies. In the space between the electrodes is the semiconductor body 3 which may consist of bismuth telluride or some other suitable semiconductor material. Because the semiconductor body and the electrodes taper towards the opening in the electrode 1, the semiconductor material will substantially only be subjected to pressure stresses upon pressure and tension forces on the electrode.

An element according to FIG. 1 is preferably manufactured by fixing the electrodes 1 and 2 in the desired position in relation to each other, after which the semiconductor material is introduced into the space between the electrodes in molten form. Suitable materials for the purpose expand upon solidification and a high pressure is therefore obtained after solidification between the electrodes and the crystal, thus giving low electric and thermic transfer resistance and good mechanical strength.

Figure 2:
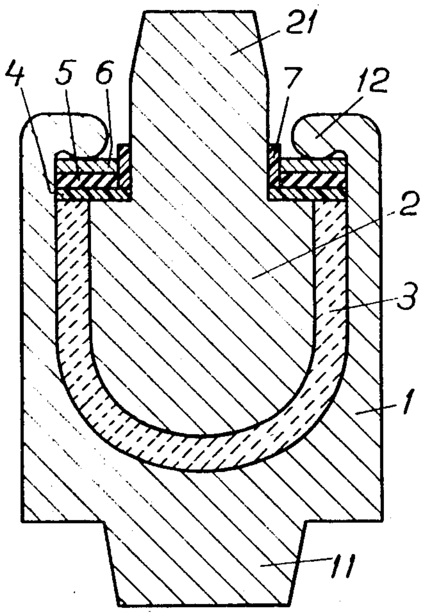

In the element according to FIG. 2, showing another embodiment of the invention, the semiconductor body 3 has a shape of a cup with an arched bottom. The electrode 2 has a part 21 projecting outside the element and having smaller cross section than the part situated inside the semiconductor body. A washer 4 is threaded over the part 21 and a ring 7 of insulating material, for example some suitable plastic material or anodized aluminum Above the washer 4 is first an elastomeric washer 5, for example of silicon rubber, and then a steel washer 6. The edge 12 of the electrode is turned down and pressed against the washer 6 to give a pressure between the electrodes and the semiconductor material. The element can therefore take up tensile forces without the semiconductor material being subjected to dangerous tension stresses. The system comprising the plates 4, 5, 6 and the ring 7 has the purpose of transferring the pressure from the down-turned edge 12 to the electrode 2 and the semiconductor body and, due to its elasticity, making the pressure less responsive to the minor dimensional alterations of the parts of the element which occur at varying temperatures. The system can be varied in any number of known or obvious ways. The ring 7 may be replaced, for example, by an insulating oxide layer on the part 21, the washer 4 may be of anodized aluminum or steel coated with aluminum oxide, etc. The elastomeric washer 5 may be a spring plate, or possibly omitted altogether if the elasticity of the element is otherwise sufficient. Similarly, the turned-down edge 12 of the electrode 1 may be replaced in known manner by a separate ring which is threaded or pressed on the electrode 1.

An element according to FIG. 2 can be manufactured, for example, by introducing the semiconductor material in powder form and the electrode 2 into the hollow space in the electrode 1. A tubular pressing tool is arranged to provide a pressure on the semiconductor material in the space between the electrodes and at the same time applies pressure on the electrode 2. A desired compression of the powder is thus obtained and the element is then heated to sintering temperature, still under pressure or with the pressure means removed. After sintering, the plates 4–6 and the ring 7 are applied and the edge 12 is then turned down and with suitable force pressed against the plates. Alternatively, the pressing tool may be removed before sintering, the washers put on and the edge turned down. Sintering is then carried out with the material under pressure from the turned-down edge. The method described has the advantage that a pressure is obtained on the semiconductor material perpendicular to the direction of the electric current over the greater part of the semiconductor body, which gives a high thermoelectric factor of the material.

Figure 3:
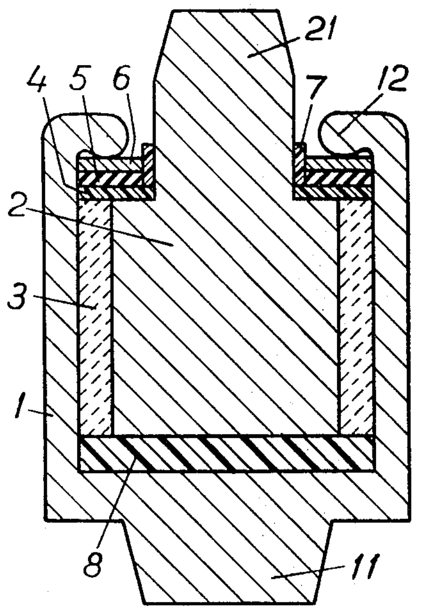

FIG. 3 shows an embodiment where the semiconductor body is shaped as a straight cylinder with no bottom. In order to obtain electric and thermic insulation between the electrodes, an insulating layer 8 is applied in the bottom of the hollow electrode 1.

The surfaces of the electrodes facing the semiconductor may be provided with grooves, ridges or threads to increase the contact surface. The surfaces may advantageously be provided with a layer of a material, such as nickel, which prevents the electrode material from diffusing into the semiconductor body. Possibly a layer of, for example, bismuth-tin alloy which melts at the sintering temperature and provides a soldering joint having low transfer resistance between the electrodes and the semiconductor material, may be applied on this layer or directly on the electrode.

We claim:

1. Semiconductor element for a thermoelectric heat pump, having a first and a second electrode and a body of a semiconducting material, said first electrode having a cup-shaped part forming a cavity open at one end, the cross section of said cavity being smaller at the open end than in the interior of said cavity, the semiconductor body comprising a shell with essentially constant wall thickness, said shell being positioned in said cavity with its outer surface in good thermal and electrical contact with the inner surface of said cavity, said second electrode having a part positioned in the interior of said shell in good thermal and electrical contact with the interior surface of said shell, the cross section of said second electrode being smaller at the open end than in the interior of said cavity.

2. Semiconductor element as claimed in claim 1, said cavity at least in the part closest to its open end having a cross section which is continuously decreasing towards its open end.

3. Semiconductor element as claimed in claim 1, said first electrode having a part extending inwardly so as to decrease the diameter of the opening of said cavity, means in contact with said diameter decreasing part and with said second electrode for absorbing pulling forces between the electrodes.

4. Semiconductor element as claimed in claim 3, said second electrode having a part protruding outside said cavity, said protruding part having a smaller cross section than that part of said second electrode which is situated inside said cavity.

5. Semiconductor element as claimed in claim 4, at least one washer being mounted around said protruding part of said second electrode and resting against the part of the second electrode which is situated inside said cavity.

6. Semiconductor element as claimed in claim 5, said washer being an elastic washer.

7. Semiconductor element as claimed in claim 1, said semiconductor body having the form of a bulb with a curved bottom.

8. Semiconductor element as claimed in claim 1, said semiconductor body having the form of a cylindrical shell open at both ends.

9. Semiconductor element as claimed in claim 8, an insulating body positioned between said electrodes at the bottom of said cavity.